United States Patent [19]
Lo et al.

[11] Patent Number: 5,637,267
[45] Date of Patent: Jun. 10, 1997

[54] CONNECTOR FOR MEDICAL PROCEDURES AND METHODS FOR MANUFACTURING SAME

[75] Inventors: Ying-Cheng Lo, Green Oaks; Lecon Woo, Libertyville; Michael T. K. Ling, Vernon Hills; Sandra Wade, Highland Park; Eddie Chan, Mundelein; Randolph H. Watkins, Wonder Lake, all of Ill.; Randy Murphey, Kenosha, Wis.

[73] Assignee: Baxter International Inc., Deerfield, Ill.

[21] Appl. No.: 432,284

[22] Filed: May 1, 1995

Related U.S. Application Data

[63] Continuation of Ser. No. 97,252, Jul. 23, 1993, abandoned.

[51] Int. Cl.⁶ .................................................. B29C 71/02
[52] U.S. Cl. .......................... 264/80; 264/127; 264/235; 264/331.14; 264/346; 264/348
[58] Field of Search .................. 264/80, 346, 235, 264/331.14, 127, 345, 348

[56] References Cited

U.S. PATENT DOCUMENTS

| | | | |
|---|---|---|---|
| 2,617,150 | 11/1952 | Rubin | 264/331.14 |
| 2,617,151 | 11/1952 | Rubin | 264/127 |
| 2,617,152 | 11/1952 | Rubin | 264/127 |
| 2,742,446 | 4/1956 | Schwarzenbek | 264/127 |
| 2,792,377 | 5/1957 | Miller | 264/331.14 |
| 2,834,992 | 5/1958 | Jupa | 264/331.14 |
| 3,184,525 | 5/1965 | Brandt | 264/127 |
| 3,986,508 | 10/1976 | Barrington | 285/3 |
| 4,011,874 | 3/1977 | Segawa et al. | 128/362 |
| 4,325,417 | 4/1982 | Boggs et al. | 141/98 |
| 4,469,835 | 9/1984 | Laurin | 524/349 |
| 4,473,369 | 9/1984 | Lueders et al. | 604/244 |
| 4,544,721 | 10/1985 | Levy | 264/288.4 |
| 4,808,351 | 2/1989 | Mukherjee et al. | 264/346 |
| 4,844,854 | 7/1989 | Kaplan et al. | 264/346 |
| 5,380,315 | 1/1995 | Isono et al. | 604/416 |

FOREIGN PATENT DOCUMENTS

| | | | |
|---|---|---|---|
| 0307507 | 3/1989 | European Pat. Off. | |
| 58-119829 | 7/1983 | Japan | 264/80 |
| 3158221 | 7/1991 | Japan | |
| WO83/02060 | 6/1983 | WIPO | |

*Primary Examiner*—Jeffery R. Thurlow
*Attorney, Agent, or Firm*—Thomas S. Borecki; Charles R. Mattenson; Robert M. Barrett

[57] ABSTRACT

A method is provided for creating a plastic component constructed, at least in part, from polychlorotrifluoroethylene, having improved properties. The method creates a component from a composition that has polychlorotrifluoroethylene, heats the component to a temperature that is greater than the melting point of the composition, and rapidly quenches the component in a cold medium.

16 Claims, 5 Drawing Sheets

CONNECTOR FOR MEDICAL PROCEDURES AND METHODS FOR MANUFACTURING SAME

This application is a continuation of U.S. patent application Ser. No. 08/097,252 filed Jul. 23, 1993, now abandoned.

BACKGROUND OF THE INVENTION

The present invention relates generally to plastics. More specifically, the present invention relates to connectors, and methods for making same, that are used for medical procedures.

It is known to mold plastics into various components and parts. These components can be used in a variety of industries, including the medical industry. Such components include connectors for connecting containers, that may include a fluid for a medical procedure, to another container, device, or to a patient. These connectors include luer connectors, spikes, ports, and the like.

By way of example, it is known to use plastic spikes in continuous ambulatory peritoneal dialysis (CAPD). CAPD is a method wherein the patient's peritoneal membrane is used as a dialysis membrane to eliminate metabolic waste from the body. This mode of dialysis, in contrast to hemodialysis and the like, allows for a more continuous removal of toxic waste, such as urea, while allowing the patient freedom of movement and a near normal lifestyle.

For a typical patient, approximately four times a day, a bag of peritoneal dialysis fluid is transferred to the patient's peritoneal cavity. After a defined dwell time, the solution is drained from the peritoneal cavity into a drainage bag. These transfers must all take place in a sterile manner.

To provide a flow path to the patient's peritoneal cavity, a catheter is placed in the patient, and a transfer set is coupled thereto. The transfer set, which thereby extends from, and provides fluid communication with, the patient, terminates in a spike. The spike allows the patient to access fluid from a peritoneal dialysis bag by spiking the bag through a port or spiking a tube set extending from the bag. In a similar manner, when it is time to drain the solution from the patient's peritonium, the patient uses the spike to access the drainage bag.

The transfer set is attached to the catheter by a healthcare practitioner using a specific medical procedure that requires the utmost sterile conditions. By extending the usable life of the transfer set, and thereby limiting the frequency of such procedures, additional convenience and improvement in the quality of life can be provided to the patient receiving CAPD. Presently, even extended wear transfer sets must be changed every four to six months.

To insure a sterile access pathway, the spike and port or luer connection is sterilized each time a connection is to be made. It is known to use UV radiation to sterilize the spike. One such device is the UV-Flash™ germicidal exchange device available from Baxter Healthcare Corp. The UV-Flash™ provides a disinfection and microbial reduction of the spike and bag port. This is accomplished by bombarding the spike and port with UV radiation.

Accordingly, the spike, because it is used for periods of up to six months, is exposed to a long term accumulation of UV radiation. This creates a tremendous burden on the material of construction for the connecting device. In this regard, the spike is the most effected of the components in the connection system by the UV radiation.

Polychlorotrifluoroethylene is typically used for constructing extended wear spikes. Polychlorotrifluoroethylene provides high UV radiation transparency that insures that the inner lumen of the spike receives a sufficient dose application. The inner lumen surface is the dialysis fluid pathway and therefore, it is essential that this surface be sterilized. An additional advantage of this material is that polychlorotrifluoroethylene compared to other plastics is quite resistant to radiation damage.

Despite these advantages that are provided by using polychlorotrifluoroethylene for the spike, these spikes are not entirely satisfactory in all situations. Polychlorotrifluoroethylene is semi-crystalline. It has a rather high melting point of approximately 220° C. Accordingly, during manufacturing, very high processing temperatures are required to convert the material to a useful shape in a thermoplastic manner.

Additionally, the material's crystallization tendency is inversely proportionate to the molecular weight, or molar mass, of the material. Therefore, to obtain the desirable mechanical properties, it is necessary to use the highest molecular weight compositions possible. This is measured in the trade as the Zero Strength Time (ZST) which is determined by ASTM test D-1430. Typically, the zero strength time must be greater than five minutes at 250° C. using ASTM D-1430.

On the other hand, however, material at such a high molecular weight is very difficult to induce to flow. This is because the viscosity of the polymer melt of such a material is exceedingly high. Accordingly, high ZST material cannot be injection molded into desirable shapes. Although lower ZST materials are injection moldable, these lower ZST materials do not have the desirable mechanical properties, and they tend to crystallize quite rapidly. Upon crystallizing, lower ZST materials turn opaque and therefore have near zero UV transmission properties, preventing the material from being used for a spike in CAPD applications.

A current method for producing extended wear spikes utilizing polychlorotrifluoroethylene is to first extrude a rod in a specialized, corrosion resistant extruder. The rod is then converted to the desired shape by precision machining.

This method of fabrication has several disadvantages. In the first instance, it is a slow extrusion process of what is a rather large rod. Heat removal in the process is not very rapid. This leads to slower cooling and greater crystallinity, i.e., a more opaque material.

Additionally, the machining process, even if the tools which are used are frequently sharpened, creates numerous machining marks along the tool path on the spike. These machining marks on the spike can likewise create optical opacity, leading to a greater absorption of UV radiation by the material. This can result in subsequent radiation damage.

Moreover, these machine marks are typically microscopic grooves which tend to act as stress concentrators at the bottom of the grooves. The combined mechanical defects from the machining grooves in conjunction with the added radiation absorption, can lead to premature failures of the spike when subjected to repeated stress during the dialysis exchange process.

There is, therefore, a need for an improved method of manufacturing connectors for use in medical procedures that are constructed at least in part from a polychlorotrifluoroethylene material.

SUMMARY OF THE INVENTION

The present invention provides an improved method for manufacturing components, that can be used in medical procedures, from compositions that include, at least in part, polychlorotrifluoroethylene. Additionally, the present invention provides improved components for use in medical procedures, or other applications wherein the components are subjected to UV radiation.

Pursuant to the present invention, improved connectors can be created by subjecting a component, constructed from a polychlorotrifluoroethylene resin, to temperatures above the melting point of polychlorotrifluoroethylene. The component is then rapidly quenched in a cold medium. This creates a component that provides maximum UV transmission. Additionally, the component has reduced mechanical defects and therefore has improved properties with respect to premature failures.

To this end, the present invention provides a method for creating a plastic component constructed, at least in part, from polychlorotrifluoroethylene, having improved properties, comprising the steps of: creating a component from a composition that comprises polychlorotrifluoroethylene; heating the component to a temperature that is greater than the melting point of the composition; and rapidly quenching the component in a cold medium.

In an embodiment, the component is heated by being immersed in a high temperature liquid.

In an embodiment, the component is heated by being contacted with a high temperature gas.

In an embodiment, the component is heated by a flame.

In an embodiment, the component is contacted by a device that generates heat.

In an embodiment, the cold medium is a fluid.

In an embodiment, the cold medium is a liquid.

Preferably, the component is heated until the opacity of the component substantially disappears.

Additionally, the present invention provides a plastic connector for use in medical procedures and that is to be sterilized by UV radiation. The connector includes a body that is constructed from a polychlorotrifluoroethylene resin, the body after being created is subjected to heat at a temperature that is greater than the melting point of the polychlorotrifluoroethylene resin, and then is subjected to rapid quenching in a cold medium.

In an embodiment, the component is a spike.

In an embodiment, the component is used in a dialysis procedure.

An advantage of the present invention is to provide an improved method for making components from polychlorotrifluoroethylene.

Still further, an advantage of the present invention is to provide an improved spike for use in medical procedures such as continuous ambulatory peritoneal dialysis.

Moreover, an advantage of the present invention is that it provides a component that has maximum UV transmission allowing the component to be easily sterilized by a UV sterilization system.

Furthermore, an advantage of the present invention is to provide a component that has greater long term reliability even when exposed to UV radiation.

Further, an advantage of the present invention is to provide a component that can be sterilized by UV radiation repeatedly and will suffer minimal radiation damage.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides an improved method for constructing plastic components that are created at least in part from polychlorotrifluoroethylene, and especially components that will be subjected to UV radiation. Although, as discussed in the preferred embodiment set forth herein, the component is a spike for use in medical procedures, it should be appreciated that the method can be used to construct other plastic components for use in the medical industry as well as components that can be used in other industries.

Figure 1:
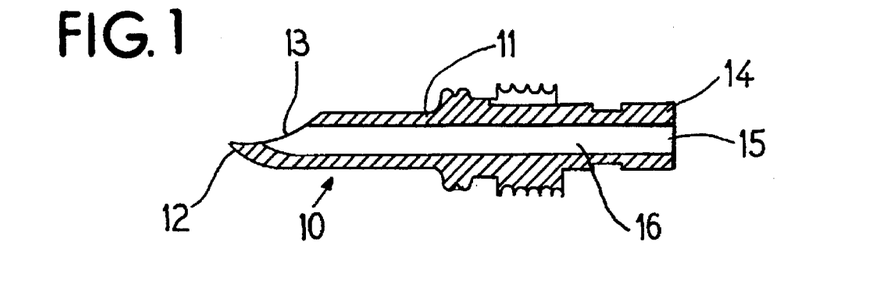
FIG. 1 illustrates a cross-sectional perspective view of a connector that can be constructed pursuant to the present invention.

Referring to FIG. 1, there is illustrated, schematically, a spike 10 for use in a continuous ambulatory peritoneal dialysis procedure. The spike 10 includes a body 11 having a pointed end 12 having an opening 13. The body 11 also includes a distal end 14, that terminates in an opening 15, for receiving a tube or other fluid flow path. The spike 10 includes an inner lumen 16 that defines a fluid flow path from the distal end 14 through the pointed end 12.

As previously discussed, in use in a CAPD system, and specifically on a transfer set, the spike 10 will be regularly exposed to UV radiation to sterilize same during its life. Pursuant to the present invention, the spike 10 is created so that it will allow improved UV radiation transmission, allowing the lumen path 16 to be sterilized. Moreover, the spike 10, due to its construction, will suffer minimum damage during the UV radiation exposure.

To this end, the spike 10 is initially created, preferably from a polychlorotrifluoroethylene resin, by any method known in the art. As set forth above, typically, such spikes 10 are created by extruding a rod from the resin in an extruder and then converting the rod into the desired shape by precision machining.

Pursuant to the present invention, however, these "finished" spikes 10 are then subjected to a further treatment. To this end, the spike 10 is exposed to elevated temperatures above the melting point of the polychlorotrifluoroethylene resin from which it is created. The spike 10 is then rapidly quenched in a cold medium, preferably liquid.

It has been found that by performing this treatment or method, the mechanical defects created by the machine process are eliminated. Additionally, the resultant component will have a low crystallinity content so as to allow maximum UV transmission. This reduced UV absorption by the material allows more UV radiation to pass through the spike body 11 to achieve greater sterilizing efficiency. Additionally, greater long term reliability is achieved by minimizing radiation damage to the spike 10 through the increased transparency.

A variety of methods can be used to heat the spike (component). Such treatments include: high temperature fluid bath immersions; high temperature gas medium contacts; flame or other radiative heat sources; or contact with shaped high temperature tools.

The duration of exposure to the heat is determined by the thermoconductivity between the heat generating medium and the component. Generally, it is believed that exposures from a few seconds to less than a few minutes are sufficient. The exposure time for a given resin, component (spike), and medium can be determined by initially observing the opacity of the component during the process. The component (spike) should be heated until the opacity of the component essentially disappears (due to crystallinity). The component (spike) will therefore be nearly transparent at this time. Once an initial component (spike) is observed, and the necessary duration of treatment is determined, further components can be treated on a mass production scale for the necessary time without the need for observation.

It has been found that normally the heat treated spikes 10 meet the dimensional tolerances required. However, by controlling the heat treatment duration, minimum changes in the spike 10 dimension can be achieved. If further control is required, the pre-treatment dimensions can be adjusted to compensate for any systematic changes that took place during the treatment.

With respect to rapid quenching, any cold medium can be used. The cold medium can comprise a fluid that surrounds the spike 10 for a period of time. Preferably, the cold medium is a liquid, such as water.

During the treatment of the present invention, it has been found that the numerous machine tool marks on the spike 10 are substantially removed. This eliminates one of the major sources of opacity that limits the UV transmission performance of the spike 10. Further, the tool marks that frequently act as stress concentrators that weaken the spike 10 can be reduced. This leads to greater improved mechanical integrity of the spike 10.

Because the crystallinity of the spike 10 is significantly reduced, very little light scattering takes place in the treated spike. This leads to enhanced UV transmission to the inner lumen 16 of the spike 10. The increased sterilizing UV radiation allows for a much improved efficiency of the spike 10.

Due to the reduction of UV radiation (absorbed) in the optical path of the spike 10, as set forth below in the example, it was discovered that the material suffered reduced damage during repeated exposure to the sterilizing radiation. This leads to a much improved long term reliability of the mechanical integrity of the spike 10.

By way of example, and not limitation, examples of the present invention will now be given.

EXAMPLE NO. 1

UV-flash disconnect transfer set spikes used by a typical CAPD patient are subjected to UV radiation 8 times UV/day for fifteen to thirty seconds each exchange. Due to this stress the spikes can break at the root of the shaft. RT spike, ~10% breakage (mainly at 5th or 6th month).

To determine the ability of the method of the present invention to improve service life of a spike after UV sterilization, the following experiments were performed. Two heat treatment methods were evaluated. Method 1 is a silicone oil immersion (see FIG. 2), and method 2 is FC-71 a vapor method (see FIG. 3).

MATERIALS: The following materials were used: Final design 0.214" OD, 0.05" radius, 0.001 rev/min surface finish UV flash spikes; Silicone oil (Dow Corning 360); Freon; FC-71 Fluorinert liquid from 3M, boiling point of 253° C. (487° F.); and VERTREL 245 Inert fluid from DuPont. Sample groups: (a sample size of thirty spikes were used for each group)

| Group | Sample Description |
|---|---|
| 1) A | Control (no treatment) |
| 2) B | Silicon oil treatment |
| 3) C | FC-71 vapor, 15 sec |
| 4) D | FC-71 vapor, 30 sec |

For groups A and B, spikes were exposed in UV for two and six months, respectively.

For groups C and D, spikes were exposed in UV for two and nine months, respectively.

Figure 2:
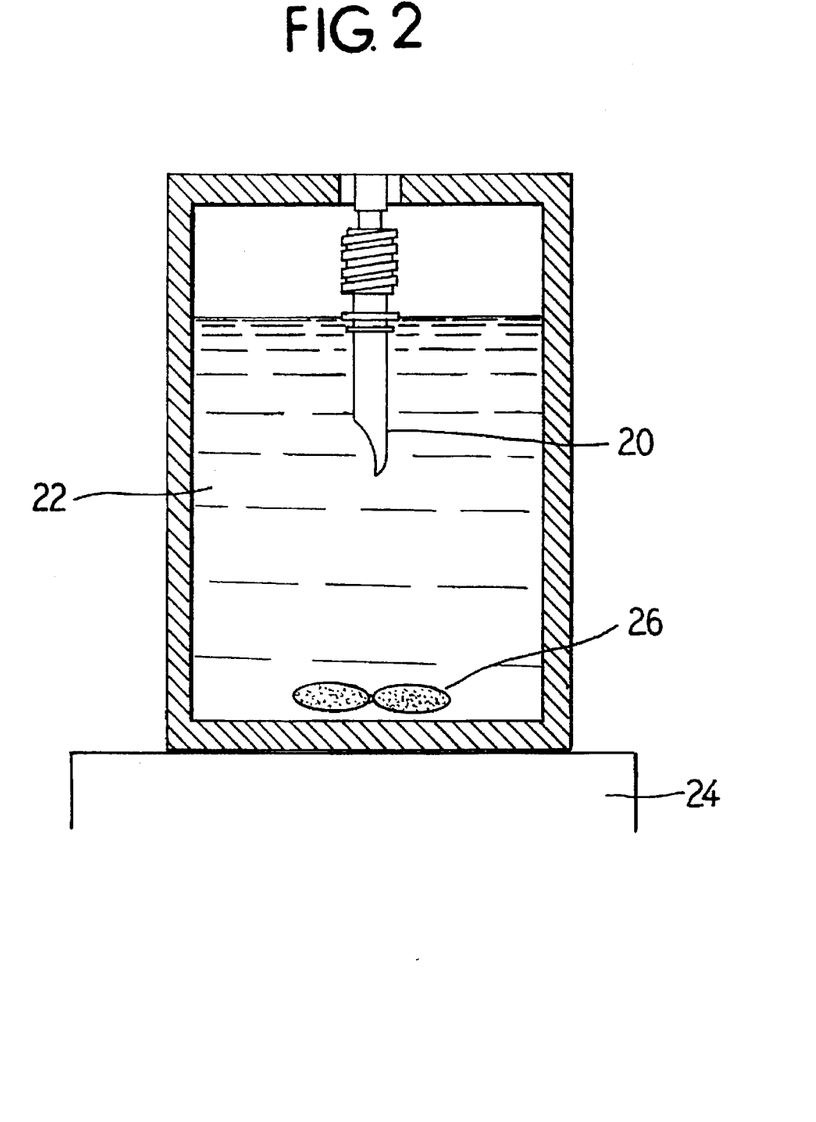
FIG. 2 illustrates schematically an embodiment of an apparatus, used in Example No. 1, for performing the method of the present invention.
Figure 3:
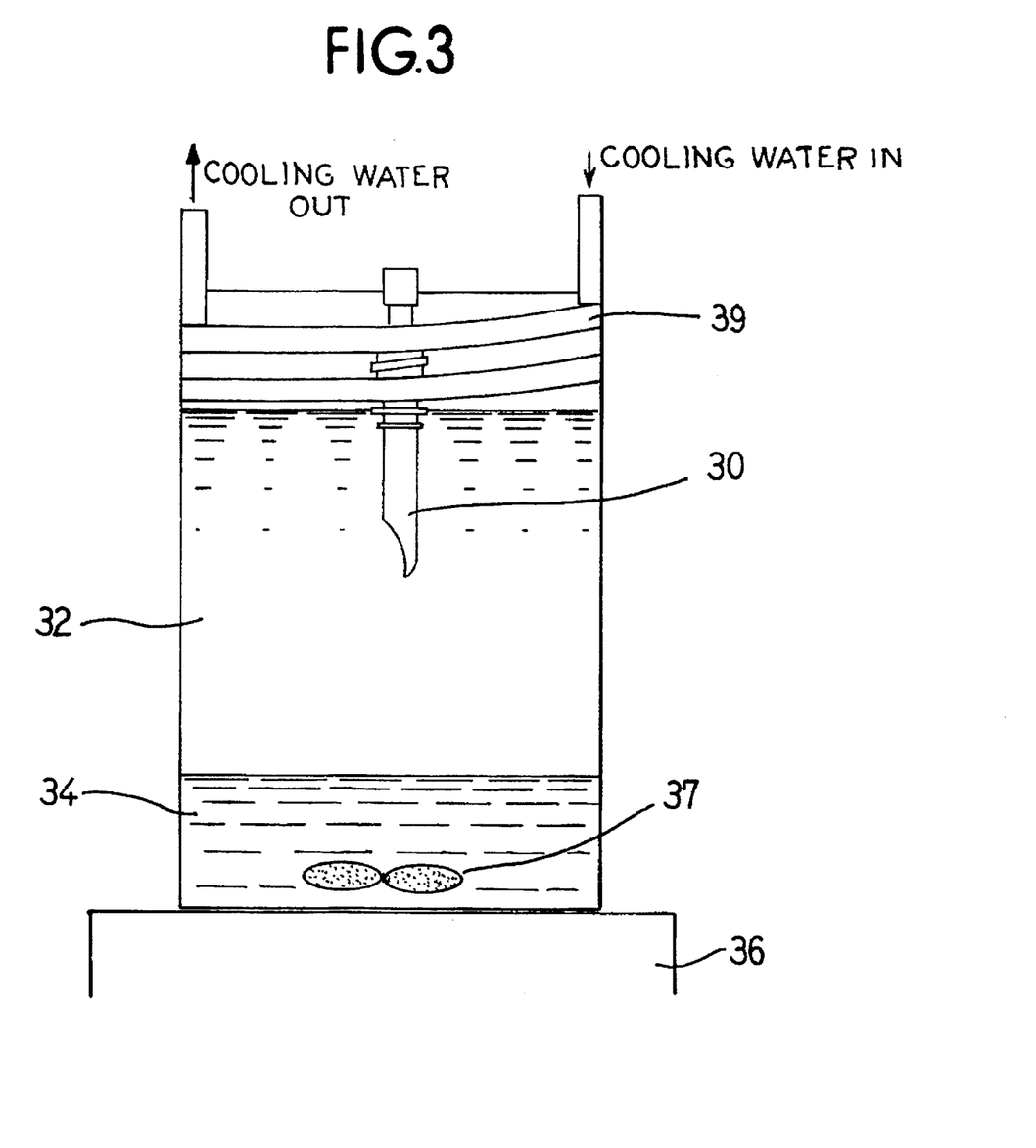
FIG. 3 illustrates schematically another embodiment of an apparatus, used in Example No. 1, for performing the method of the present invention.

EQUIPMENT: The following equipment was used. Hot silicon oil bath (FIG. 2); FC-71 vapor fixture (FIG. 3); 30 UV flash boxes; Mentler analytical balance AE240; Mitutoyo digimatic caliper; UV transmittance equipment: International light research radiometer model IL 1700 and spectroline UV light 254 nm model EF-140; and MTS tensile tester.

PROCEDURES

Two heat treatment processes were used.

Silicone oil immersion treatment (see FIG. 2)—the spike 20 was partially immersed in a silicone oil bath 22. The bath 22 was heated to 250° C. by a hot plate 24. A stirring bar 26 was provided. The spike 20 was immersed in the bath 22 for one minute. The spike 20 was then quenched in cool water for 1 minute and cleaned with Freon. The spikes were then dried in a vacuum @60° C. for 72 hours.

FC-71 vapor treatment (see FIG. 3)—the spike 30 was partially immersed (up to the first thread) in FC-71 vapor for fifteen or thirty seconds. The FC-71 vapor 32 was generated by heating FC-71 liquid 34 with a hot plate 36. Again, a stirring bar 37 was provided. The spike was then quenched in cool water for thirty seconds, using a cooling coil 39, and cleaned with VERTREL 245. The spikes were then dried in a vacuum @60° C. for 72 hours.

The following cleaning process was used: Cleaning of the heat treated spikes progressed from using Freon in a three sump cleaner to using an alternate Freon and vacuum drying. When heat treating with Silicone, the three sump cleaner and Freon were used to remove as much of the Silicone as possible. This cleaning method was used on the first group of FC-71 heat treated spikes. The spikes were submersed in boiling Freon from DuPont for one minute. The boiling point is the same as Freon TF (45° C). The spikes were then vacuum dried for 72 hours at 60° C. and 25 in Hg of vacuum. This method of drying was used to pull residual FC-71 out of the material.

UV transmission: The UV transmittance of each spike was measured before the heat treatment occurred. The transmittance was measured on an IL1700 Research Radiometer. To measure UV transmittance, the spike was inserted into a fixture that allows only a sliver of UV light to pass through the spike and onto a detector which sends a signal to the radiometer. Measurement units are J/cm². A reference reading was taken for each spike followed by the spike reading. Percent transmittance is calculated by dividing the spike reading by the reference reading and multiplying by 100.

Testing processes:

Weight and dimension

UV transmittance was measured

Back out

Break energy

RESULTS AND DISCUSSION

The results are set forth in Table I below:

TABLE I

| Test Methods | Group A Control | Group B Silicone oil | Group C & D FC-71 vapor 15 & 30 sec. |
|---|---|---|---|
| 1) Weight change | remain constant | remain constant | <0.2% increase |
| 2) Diameter of the shaft (0.214") | remain constant | 0.002" to 0.005" increase | 0.002" to 0.007" increase |
| 3) UV transmission | 2% | 12 ± 5% | 8.6 ± 6.1% (C) 3.8 ± 2.7% (D)** |
| 4) Break Energy | | | |
| No UV (in-lb) | 6.8 ± 1.7 | 13.3 ± 0.5 | 13.7 ± 1.0 (C) 14.1 ± 0.4 (D) |
| 6 mo UV (in-lb) | 1.5 ± 1.3 | 7.8 ± 4.3 | |
| 9 mo UV (in-lb) | | | 5.7 ± 1.1 (C) 6.9 ± 1.1 (D) |
| 5) Back out | No | No | No |
| 6) Cleaning agent | Aqueous | Freon | VERTREL 245 |

**With Freon as cleaning agent, UV transmission is 7.8 ± 1.6%

After nine months of UV equivalent exposure, FC-71 vapor heat treated spikes had similar break energy as the untreated spike before UV exposure. This indicated that the FC-71 vapor heat treatment increases service life of the spike. Heat treatment also improved the UV transmittance of the spikes. Although diameter of the shaft increased by 0.002" to 0.007" (still less than 0.216"), no back out had been observed.

The percentage of UV transmitted through seven groups of untreated CTFE spikes was measured. The values obtained were as follows:

| % UV Transmittance Of CTFE Spikes (before heat treatment) | | | | | | | |
|---|---|---|---|---|---|---|---|
| | A | B | C | D | E | F | G |
| Average | 2.0 | 2.1 | 2.1 | 2.0 | 2.1 | 2.1 | 2.1 |
| Std Dev | 0.2 | 0.1 | 0.2 | 0.1 | 0.2 | 0.1 | 0.2 |
| Max | 2.3 | 2.3 | 2.3 | 2.2 | 2.4 | 2.3 | 2.3 |
| Min | 1.7 | 1.8 | 1.7 | 1.8 | 1.7 | 1.9 | 1.8 | n = 20/group; except group A in which n = 30

The spikes in group G (shown below) were heat treated for varying time lengths in FC-71. Following heat treatment, the spikes were cleaned in a three sump Freon degreaser for ten seconds in the sumps 1 and 2, and twenty seconds in sump 3 (the cleanest sump). UV transmittance was then measured.

| 15 sec treatment | | 30 sec treatment | | 45 sec treatment | | 120 sec treatment | |
|---|---|---|---|---|---|---|---|
| Group# | % T | Group # | % T | Group# | % T | Group# | % T |
| 4 | 10.5 | 5 | 10.1 | 2 | 16.1 | 1 | 1.5 |
| 8 | 11.5 | 6 | 6.6 | 11 | 4.4 | 3 | 2.6 |
| 10 | 17.3 | 12 | 8.7 | 13 | 3.6 | 7 | 1.2 |
| 14 | 13.7 | 15 | 7.0 | 16 | 4.5 | 9 | 1.3 |
| 20 | 12.9 | 18 | 6.6 | 17 | 3.6 | 19 | 1.4 |
| Average | 13.2 | | 7.8 | | 6.4 | | 1.6 |
| Std Dev | 2.6 | | 1.6 | | 5.4 | | 0.6 |
| Max | 17.3 | | 10.1 | | 16.1 | | 2.6 |
| Min | 10.5 | | 6.6 | | 3.6 | | 1.2 |

% UV Transmittance Pretreatment Average = 2.1

% Variance from Pre-treatment Average*

| 15 sec | 30 sec | 45 sec | 120 sec |
|---|---|---|---|
| 528% | 271% | 205% | −24% |

*Note: % Var = (Post % T − Pre % T)/Pre %T*100

Figure 4:
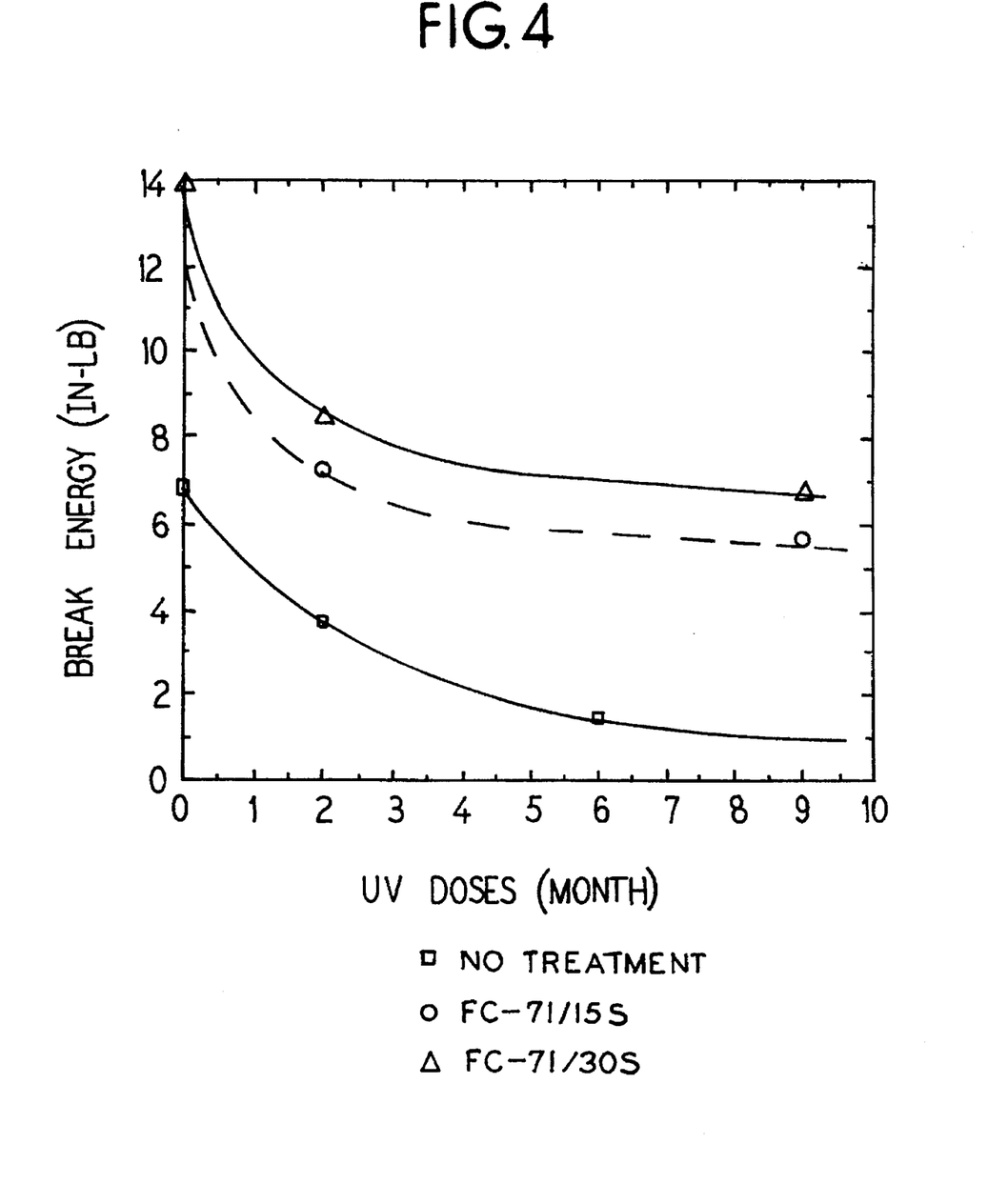
FIG. 4 illustrates, graphically, a comparison of UV dose versus break energy of a spike created pursuant to the present invention and a typical prior art spike.
Figure 5:
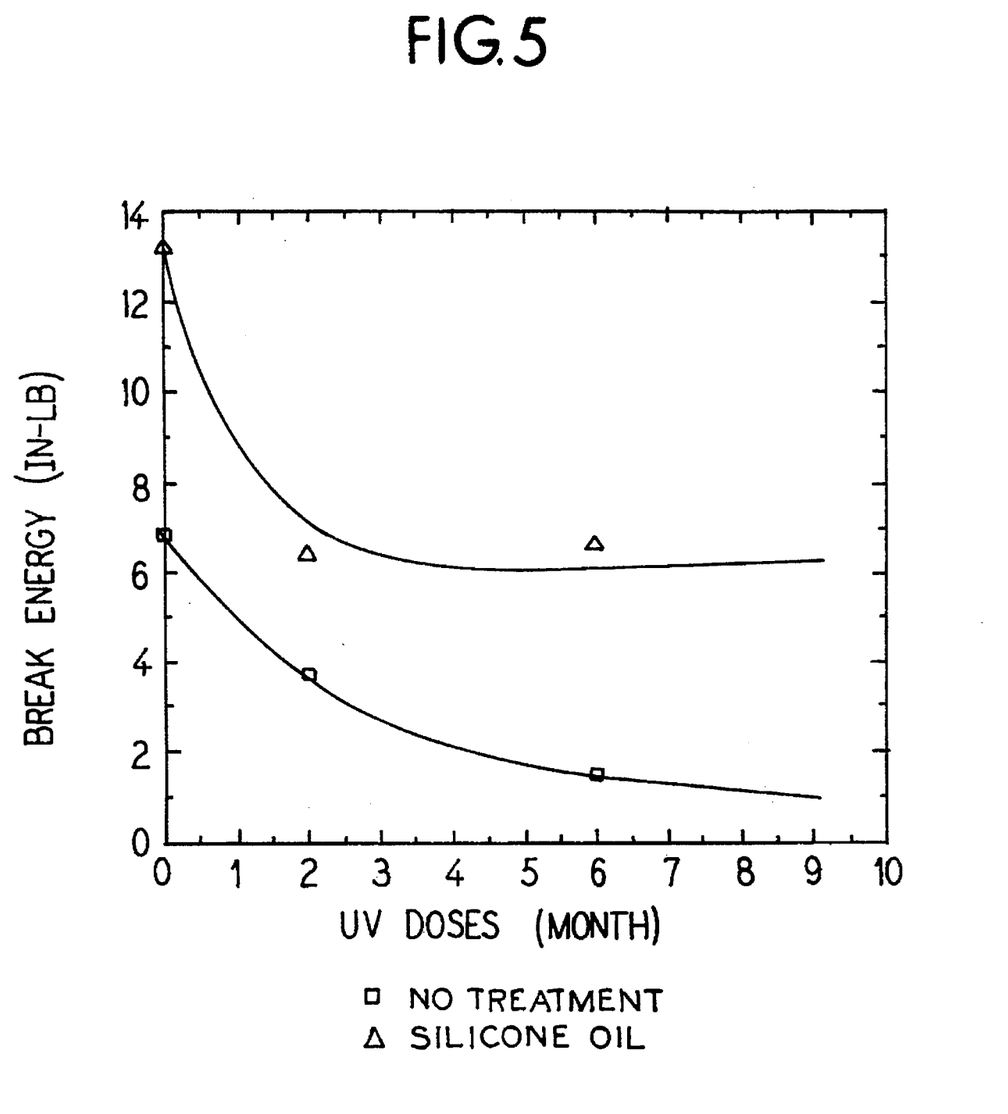
FIG. 5 illustrates, graphically, further test results of UV dose versus break energy of spikes created pursuant to the present invention and spikes created pursuant to the prior art.
Figure 6:
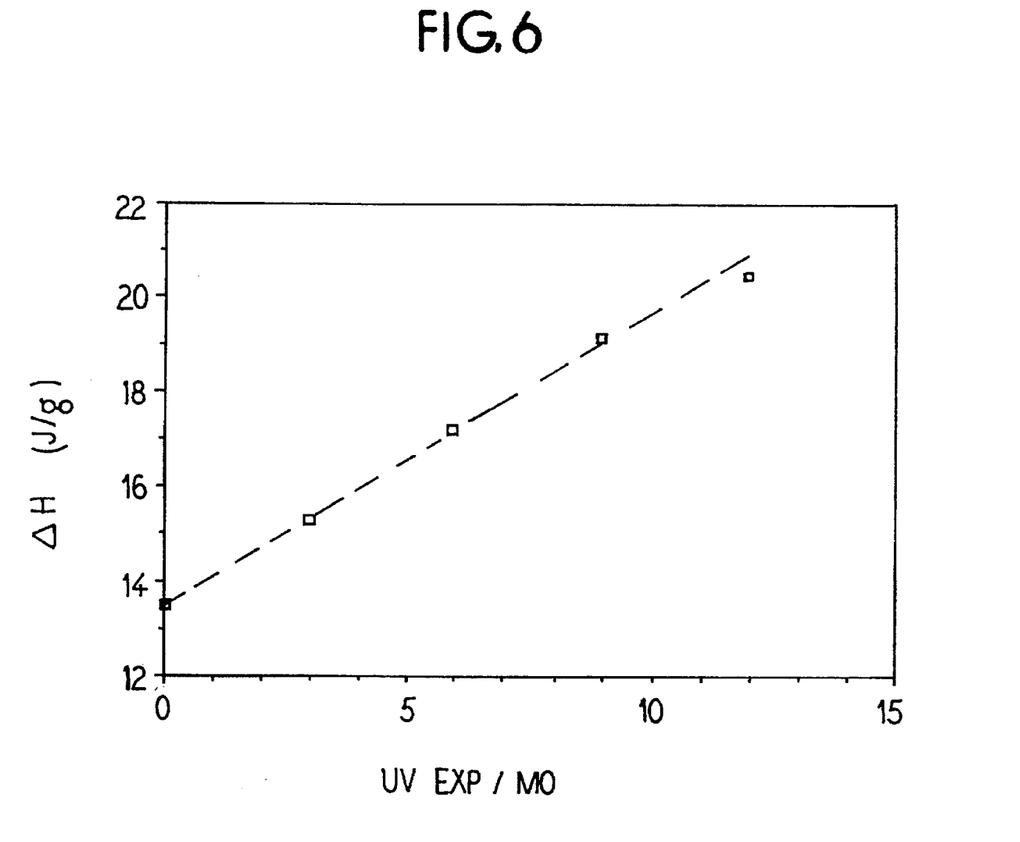
FIG. 6 illustrates heat of fusion (indicator of crystallinity) for spikes created pursuant to the present invention.

FIGS. 4 and 5 illustrate graphically the improvement achieved by the present invention vis-a-vis untreated spikes. FIG. 6 illustrates graphically the degree of crystallinity for spikes constructed pursuant to the present invention.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method for creating a plastic component constructed at least in part from polychlorotrifluoroethylene, the component having improved UV transmission properties, the method comprising the steps of:

providing a component made from a composition that comprises, at least in part, polychlorotrifluoroethylene wherein the component is a spike having an internal passageway with openings at each end of the spike with the passageway formed between the openings;

heating the component to a temperature that is greater than the melting point of the polychlorotrifluoroethylene to achieve the improved UV transmission properties; and rapidly quenching the component in a cold medium.

2. The method of claim 1 wherein the component is heated by immersion in a high temperature liquid.

3. The method of claim 1 wherein the component is heated by contact with a high temperature gas.

4. The method of claim 1 wherein the component is heated by a flame.

5. The method of claim 1 wherein the component is heated by contact by a device that generates heat.

6. The method of claim 1 wherein the cold medium is a fluid.

7. The method of claim 1 wherein the cold medium is a liquid.

8. The method of claim 1 wherein the cold medium includes water.

9. The method of claim 1 wherein the component is heated until the opacity of the component substantially disappears.

10. A method for creating a plastic connector for use in medical procedures wherein the plastic connector has improved UV transmission properties, the method comprising the steps of:

providing a plastic component made from a polychlorotrifluoroethylene resin wherein the plastic component is a spike having an internal passageway with openings at each end of the spike with the passageway formed between the openings;

heating the plastic component to a temperature that is greater than the melting point of the polychlorotrifluoroethylene resin to achieve the improved UV transmission properties; and quenching the plastic component in a cold liquid.

11. The method of claim 10 wherein the component is heated by immersion in a high temperature liquid.

12. The method of claim 10 wherein the component is heated by contact with a high temperature gas.

13. The method of claim 10 wherein the component is heated by a flame.

14. The method of claim 10 wherein the component is heated by contact by a device that generates heat.

15. The method of claim 10 wherein the component is heated until the opacity of the component substantially disappears.

16. The method of claim 10 wherein the cold liquid is water.

* * * * *